United States Patent [19]
Hill et al.

[11] Patent Number: 5,305,402
[45] Date of Patent: Apr. 19, 1994

[54] TUNABLE OPTICAL FILTERS

[75] Inventors: Alan M. Hill; David B. Payne, both of Woodbridge; Kevin J. Blyth, Harleston, all of England

[73] Assignee: British Telecommunications Public Limited Company, London, England

[21] Appl. No.: 930,683

[22] PCT Filed: Feb. 20, 1991

[86] PCT No.: PCT/GB91/00264
§ 371 Date: Oct. 6, 1992
§ 102(e) Date: Oct. 6, 1992

[87] PCT Pub. No.: WO91/13377
PCT Pub. Date: Sep. 5, 1991

[30] Foreign Application Priority Data

Feb. 20, 1990 [GB] United Kingdom ............... 9003768
Apr. 25, 1990 [GB] United Kingdom ............... 9009306
Oct. 11, 1990 [GB] United Kingdom ............... 9022126

[51] Int. Cl.$^5$ .................................. G02B 6/26
[52] U.S. Cl. ........................... 385/25; 385/18; 385/22; 372/6; 372/94
[58] Field of Search ............... 385/16, 17, 18, 22, 385/23, 24, 25, 37; 372/6, 94; 359/130, 152

[56] References Cited

U.S. PATENT DOCUMENTS

| | | | |
|---|---|---|---|
| 4,111,524 | 9/1978 | Tomlinson, III | 385/37 |
| 4,153,330 | 5/1979 | Tomlinson, III | 385/37 |
| 4,522,462 | 6/1985 | Large et al. | 385/37 |
| 4,763,969 | 8/1988 | Khoe et al. | 385/37 |
| 4,768,853 | 9/1988 | Bhagavatula | 385/37 |
| 4,834,485 | 5/1989 | Lee | 385/37 |
| 4,838,645 | 6/1989 | Mächler et al. | 385/37 |

FOREIGN PATENT DOCUMENTS 123237 10/1984 European Pat. Off. .
87/01246 2/1987 World Int. Prop. O. .

OTHER PUBLICATIONS

Patent Abstracts of Japan, vol. 5, No. 201, (P-94)(873), Dec. 19, 1981, JP,A,56-122,002, Takumi Tomijima, Sep. 25, 1981.
Patent Abstracts of Japan, vol. 13, No. 375, (P-921)(3723), Aug. 21, 1989, JP,A,1-129,209, Matsushita Electric Ind. Co. Ltd., May 22, 1989.
Jopson et al., Applied Physics Letters, vol. 48, No. 3, Jan. 20, 1986, "A 1.55 μm semiconductor-optical fiber ring laser", pp. 204-206.

*Primary Examiner*—Frank Gonzalez
*Attorney, Agent, or Firm*—Nixon & Vanderhye

[57] ABSTRACT

A tunable optical filter includes an array of optical fibre located within a capillary tube and mounted on a solenoid movable support and positioned in front of a lens and diffration grating. The filter provides simultaneous tuning filtering between fibres. By coupling fibres to a ring laser and fibre to an optical receiver simultaneous tuning of a laser and receiver is possible. The filter finds particular application in passive optical networks.

16 Claims, 11 Drawing Sheets

TUNABLE OPTICAL FILTERS

BACKGROUND OF THE INVENTION

1. Field of the Invention

This invention relates to optical filters and is of particular, but not exclusive, application to passive optical network transmission systems.

2. Related Art

One approach to providing communications links between stations is to employ a passive optical network between a central station, or exchange, and the stations.

A potential strategy for the evolution of passive optical splitter networks providing customer access in the local loop is as follows. Telephony and low data-rate services could initially be provided over a fibre-lean passive optical network (TPON) at a single operating wavelength, such as 1300 nm. Broadband services could then be added in two separate stages. Firstly, coarse-grained wavelength division multiplexing (WDM) could provide a few wavelength channels in the 1300 nm window: 20 nm spacing has been demonstrated, but a closer spacing of perhaps 10 nm is quite feasible. Just three additional wavelengths, 1280 nm, 1320 nm and 1340 nm, would be sufficient to provide a range of early broadband services such as ATM-based high-speed data, 32-channel broadcast digital video and 32-channel dedicated (switched) video. A fourth wavelength might be used to provide several HDTV channels. This approach would leave the 1500 nm window free for high density WDM (HDWDM) to be used in the longer term, when large numbers of channels are needed, in combination perhaps with the use of erbium-doped fibre amplifiers, or to provide two-way broadband customer services by wavelength multiplexing in the upstream direction. A nominal wavelength spacing of 1 nm has been demonstrated for HDWDM.

A major difficulty, however, of employing tunable lasers at customers' premises is that of accurate referencing of the laser wavelengths, particularly for HDWDM, where channels may be spaced as close as 1 nm or less. For broadcast services such as cable TV, tunable filters are key components for selecting wavelength channels.

Many tunable filter technologies have been demonstrated offering various tuning ranges and bandwidths including DFB laser amplifiers, etalons, acousto-optics, and variable-pitch, position-tuned devices based on reflection holograms in dichromated gelatin.

For a device to be suitable for installation in customers' premises, it must employ a technology that lends itself to low cost mass production.

SUMMARY OF THE INVENTION

The present invention provides an optical filter comprising an optical dispersion means, first and second optical waveguides mounted on a common support such that a multiplex of optical wavelength channels launched from one of the optical waveguides into the optical dispersion means is receivable by the other optical waveguide after dispersion by the optical dispersion means, and means for moving the support relative to the dispersion means, whereby said other optical waveguide sweeps through the dispersed wavelength spectrum of the multiplex of wavelength channels, thereby allowing any desired wavelength channel to be coupled into said other waveguide.

The waveguides optically coupled by the dispersion means constitute input and output waveguides of the filter.

Such a tunable filter can use mass produced supports to move the optical waveguides precise, small distances such as are used in compact disc players to control the reading lasers' positions for example, and appears to offer, at present, the best overall performance in terms of insertion loss, optical bandwidth and interchannel crosstalk.

In order to provide two-way broadband services employing high-density wavelength multiplexing in the upstream direction, every customer's laser on a passive optical network must transmit at a distinct wavelength different from all others, and these wavelengths must be accurately positioned to form a high-density multiplex as the customers' signals combine through the optical splitters.

The optical filter may include a third optical waveguide mounted on the common support.

According to a further aspect of the present invention an optical assembly comprises two or more optical filters as defined above, each filter having a common optical dispersion means, and each support being independently movable relative to the optical dispersion means.

The first optical waveguide could be coupled to an incoming wavelength multiplex, the desired output wavelength being coupled into the second optical waveguide, with the third optical waveguide being coupled to an external cavity laser. This provides simultaneous tuning of the wavelength of the transmitter laser and the received signal of the optical multiplex at a transceiver (i.e. a combined transmitter and receiver) incorporating the filter.

Alternatively, the first and second optical waveguides may form part of a ring laser with the third optical waveguide located so as to receive an optical signal launched from one of the first or second optical waveguides after dispersion by the optical dispersion means. The filter may include an optical coupler coupled to one of the first and second optical waveguides, whereby an optical signal can be coupled to the ring laser and launched into the dispersion means so as to be received by the third optical waveguide after dispersion by the optical dispersion means. With this arrangement, simultaneous tuning of the ring laser and the single received wavelength from an optical multiplex is achieved.

This arrangement provides tunable wavelength filtering between each input waveguide and its respective output waveguide simultaneously in the same device. In particular, such an optical filter permits simultaneous tuning of a ring laser and an optical receiver by a single dispersion means, so providing a means for wavelength referencing the optical transmitter and receiver of a station in an optical transceiver.

The filter can be tuned by moving one of the pairs of input and output waveguides relative to the dispersion means, which may have a diffraction grating as the dispersion element, for example, but preferably all the waveguides are moved together when simultaneous coordinated tuning is required to simplify construction of the filter by mounting them on a common support.

The input and output waveguides can be positioned such that each output optical waveguide receives substantially the same wavelengths from the respective input waveguide which provides tuning of the laser and receiver to the same wavelength in an optical transceiver.

Alternatively, the waveguides can be positioned to provide a wavelength separation between the transmitted and received wavelengths. In this case, there will be a fixed, although perhaps non-linear, relationship between the received and transmitted wavelengths, thereby again associating a given transmitted wavelength channel with a corresponding, predetermined, received wavelength.

The movable waveguides are conveniently mounted on a support movable by a solenoid.

The optical waveguides may comprise optical fibres, the input fibres end-firing optical signals into the dispersion means. The ends of the fibres may be lensed.

One input fibre and a respective output fibre may form part of a ring laser having an optical amplifier.

Alternatively, one of the waveguides may be formed by the optical amplifier itself.

Tuning is obtainable by moving the support along the dispersion plane with the movement within, or orthogonal to, the plane of the first and second optical waveguides. When two pairs of fibres are moved together, one pair may be arranged to be moved within the plane defined by that pair of fibres, the other pair being moved orthogonally to the plane defined by this other pair of fibres. Other arrangements are also possible but may have poorer cross-talk characteristics than these two arrangements just described.

BRIEF DESCRIPTION OF THE DRAWINGS

Embodiments of the invention will now be described, by way of example only, with reference to the accompanying drawings, of which

DETAILED DESCRIPTION OF EXEMPLARY EMBODIMENTS

Figure 1:
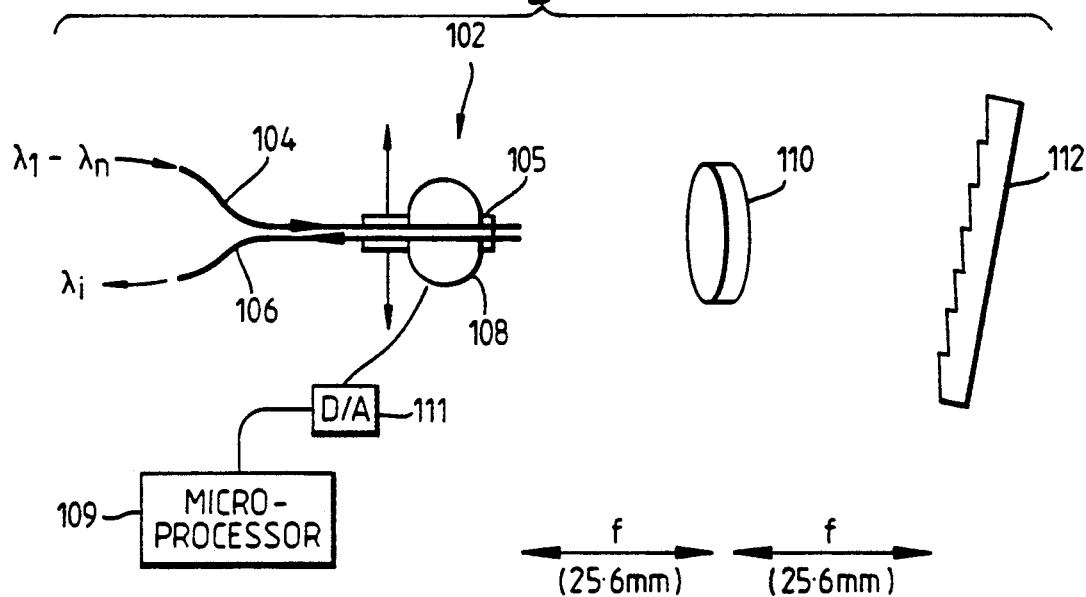
FIG. 1 is a schematic view of a tunable optical filter according to a first aspect of the present invention.

The construction of a tunable filter is shown in FIG. 1. A two-fibre assembly 102, which comprises a single-mode input fibre 104 carrying a multiplex of wavelength channels, $\lambda_i$ to $\lambda_n$ and a single-mode output fibre 106 (the fibres being mounted parallel to one another in a glass capillary 105), is attached to a drive solenoid 108 behind a collimating doublet lens 110. The light from the fibre 104 is dispersed by a grating 112 to produce a spectrum of the wavelength channels in the focal plane of the lens 110. Movement of the two-fibre assembly 102 relative to the grating 112 and the lens 110 causes the output fibre 106 to sweep through the wavelength spectrum, and allows any desired channel, $\lambda_i$ say, to be coupled into the output fibre 106. In this device, movement of the two-fibre assembly 102 is achieved using the drive solenoid 108 which may obtained from the optical pick-up unit of a compact disc player. The positions of the fibres 104 and 106 are controlled by an external microprocessor 109 which generates a 12-bit binary word to provide a precise current feed to the coil, via a digital-to-analogue (D/A) converter 111.

Movement of both input and output fibres 104 and 106 as one unit relative to the dispersion means 110, 112 has two significant advantages over moving only one fibre. Firstly, a much simpler movement system and optical design can be implemented, and secondly, a doubling of the wavelength tuning range for a given displacement is obtained. The dispersion of the filter 102 is given by the grating equation $$\sin \alpha + \sin \beta = p\lambda/nd \qquad (1)$$

where $\alpha$ and $\beta$ are the incident and diffracted angles to the grating normal respectively, d is the groove spacing of the grating 112, n is the refractive index (n=1 in air), p is the diffracted order, and $\lambda$ the wavelength. With the two-fibre assembly 102 of FIG. 1, the fibres 104 and 106 have a core-to-core separation of 200 $\mu$m, so that $\alpha$ and $\beta$ are approximately equal. The dispersive element 112 in the filter design is a standard 600 lines/mm reflection grating, blazed at 1.6 $\mu$m. To provide a tuning range of 150 nm centred at 1525 nm, this grating pitch requires an angular change of 2.9° at the grating, which is equivalent to a fibre displacement behind the 25.6 mm focal length doublet lens of only 1.3 mm.

The device of FIG. 1 has a fibre-to-fibre insertion loss of only 2.9 dB. This loss is made up of Fresnel reflections (0.36 dB), diffraction efficiency of the grating (2.1 dB) (polarisation dependence was approximately 1.2 dB), and an excess loss of 0.44 dB due to difficulties in angular alignment of the fibres, astigmatism, and off-axis aberrations, which increase the spot size at the imaging point. In the future, elimination of Fresnel reflections and the use of higher efficiency polarisation independent gratings should reduce losses by 1.5-2.0 dB. The bandwidth (FWHM) of the filter is 0.59 nm.

Figure 2:
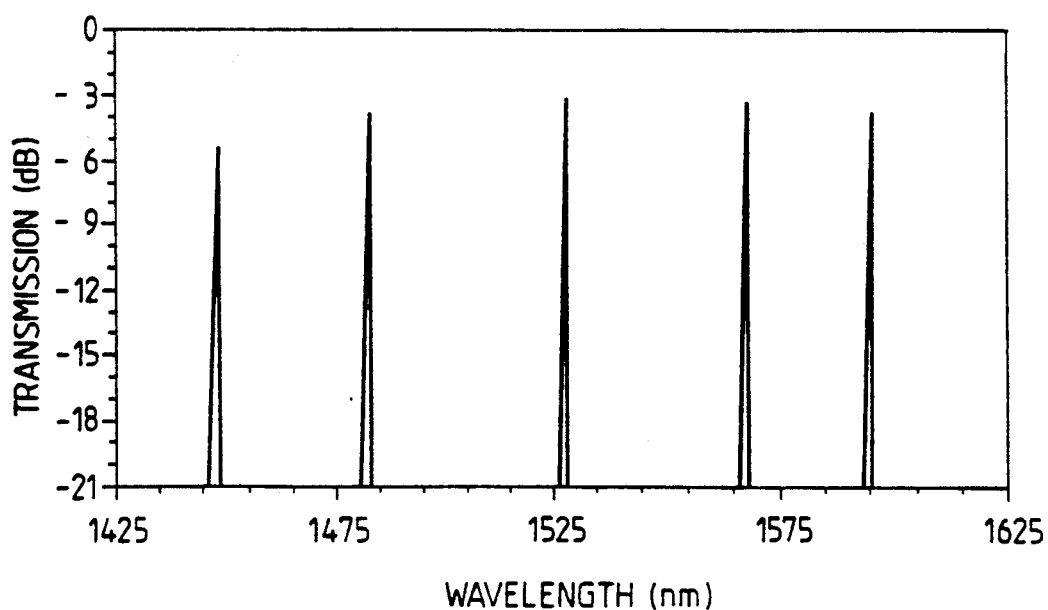
FIG. 2 is a graph of the transmission performance of the tunable filter of FIG. 1.

FIG. 2 shows the available tuning range of 150 nm, with filter responses for several fibre positions of the filter of FIG. 1. The roll-off in filter transmission away from the centre wavelength is due to a combination of grating efficiency and chromatic aberrations.

In order to assess the crosstalk performance of the filter when selecting channels from a wavelength multiplex, a more detailed, expanded spectral response is needed to give a true measure of interchannel crosstalk. This is obtained with the experimental arrangement of FIG. 3, which measures the total power from an unwanted channel that passes through both the multiplexer and the tunable filter. A single DFB laser 114 transmitting at 1552 nm transmits through a wavelength multiplexer 116, having 0.3 nm FWHM bandwidth, and the 0.6 nm tunable filter 102 as shown in FIG. 1, to an optical power meter 120.

Figure 4:
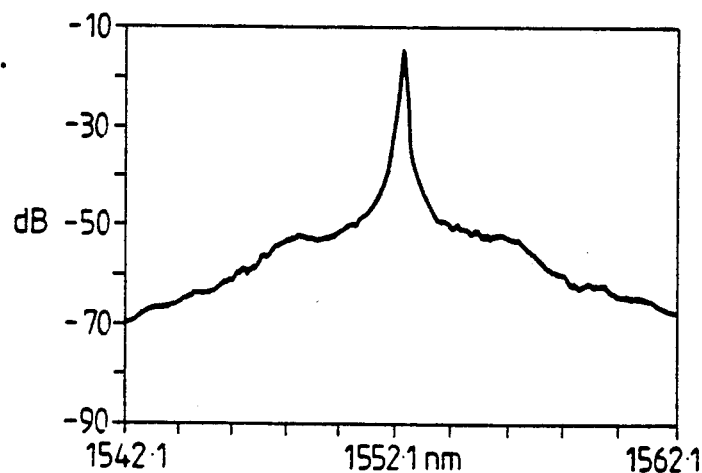
FIG. 4 is a graph of the spectrum of a 1552 nm laser as measured through the multiplexer of FIG. 1.
Figure 5:
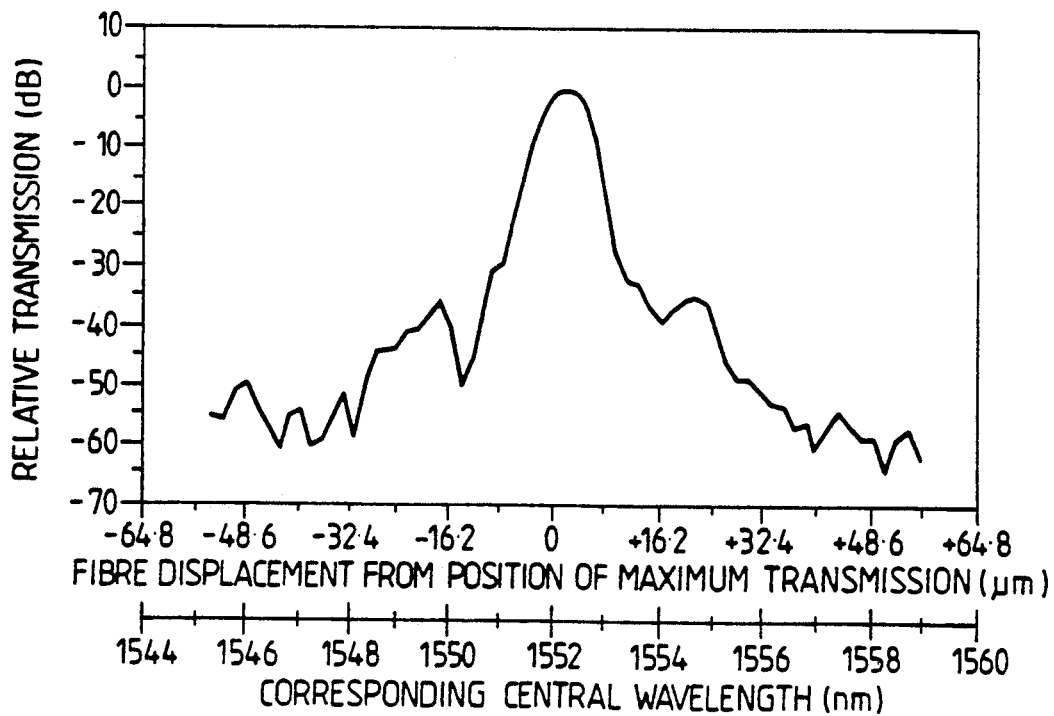
FIG. 5 is a graph of the cross-talk performance of the tunable filter of FIG. 1.

FIG. 4 shows the resulting DFB laser spectrum, including the spontaneous emission, passing through the multiplexer 116. The crosstalk performance, shown in FIG. 5, is measured with the optical power meter 120 by collecting all the light from the DFB laser 114 that passes through the filter 102, as it is tuned away from the 1552 nm centre wavelength. From FIG. 5 it can be seen that channels separated by 0.75 nm would give a single adjacent channel crosstalk level of −18 dB. This is actually obtained in practice by temperature tuning two DFB lasers to a 0.75 nm wavelength spacing. The filter 102 strongly rejects wavelengths more than 2 nm away from the centre wavelength, by 35-40 dB. Fully out-of-band rejection is 45-50 dB.

Figure 3:
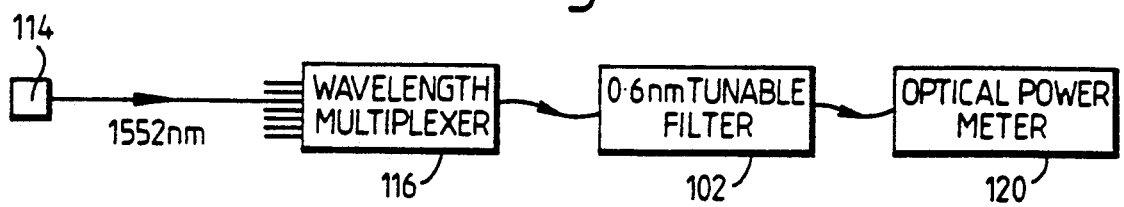
FIG. 3 is a schematic diagram of an experimental arrangement to measure the channel cross-talk of the filter of FIG. 1.
Figure 6:
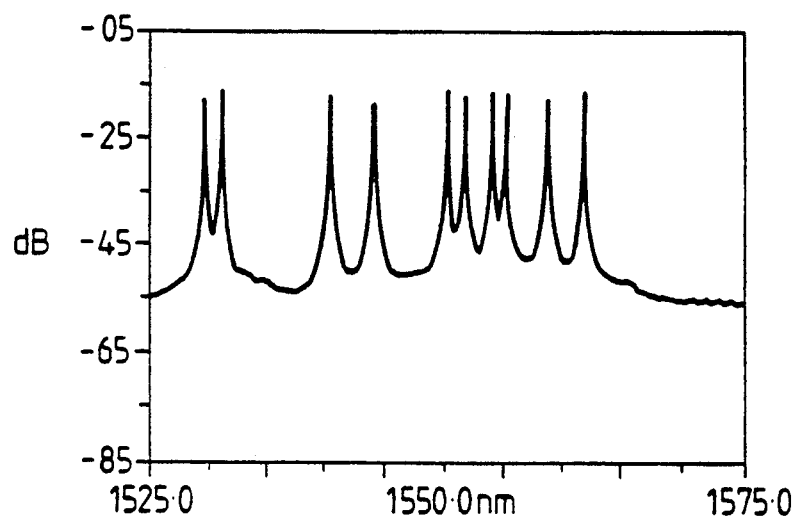
FIG. 6 is a graph of a multiplex of ten DFB lasers channels.
Figure 7:
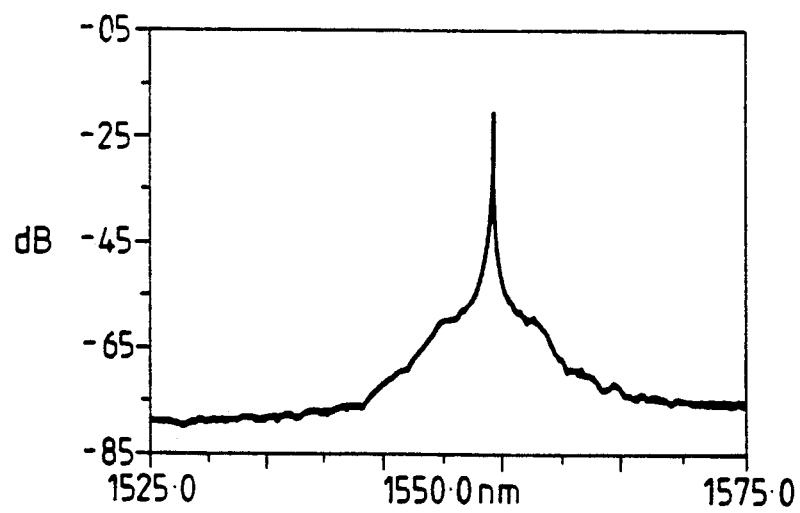
FIG. 7 is a graph of one of the channels of FIG. 6 selected by the filter of FIG. 1.

The tunable filter 102 can also be used, in the configuration of FIG. 3, to select individual wavelength-multiplexed channels. FIG. 6 shows a multiplex of 10 DFB lasers, multiplexed by a combination of a 19-channel single-mode grating multiplexer, with 3.6 nm channel spacing, and fused fibre couplers (none shown). The closest channels in this multiplex are separated by 1.1 nm. The tunable filter 102 is placed at the output of the multiplexer and tuned to the various wavelengths. FIG. 7 shows the filter 102 selecting a single wavelength channel from this multiplex. The crosstalk level from an adjacent channel 1.1 nm away is seen to be lower than −30 dB, and the spectral response (FIG. 5) clearly eliminates crosstalk from all but the closest channels.

Figure 8:
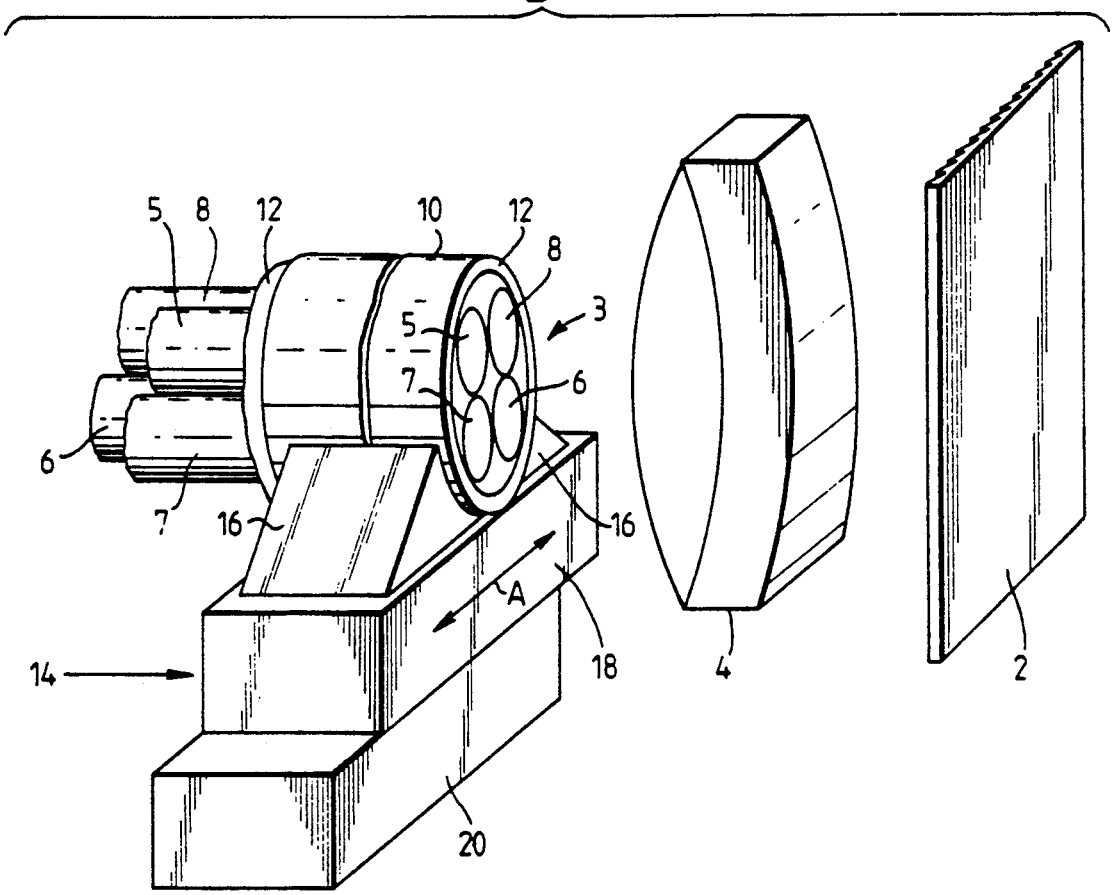
FIG. 8 is a schematic perspective view of a tunable optical filter according to a further aspect of the present invention.

Referring now to FIG. 8, an optical filter includes a blazed diffraction grating 2 and a doublet collimating lens 4, constituting the optical dispersion means.

Positioned on the other side of the lens 4 to the grating 2 is a square array 3 of four, single mode optical fibres 5, 6, 7 and 8 within a glass capillary tube 10. The fibres 5 to 8 are threaded into the capillary tube 10 until their ends are substantially flush with the front end 12 of the capillary tube 10 as determined by visual inspection with a microscope. The fibres 5 to 8 are then fixed in position within the tube 10 by UV curable resin 12 applied to the rear of the tube 10.

The capillary tube 10 is then fixed to a solenoid movable support 14 by UV curable resin 16. The support 14 is shown purely schematically as a pair of blocks 18 and 20 to represent a solenoid driven actuator element of a compact disc player.

The support 14 can move the fibres 5 to 8 in the directions shown by the arrows A in the plane of dispersion. The support 14 may also be provided with an actuator acting in the vertical direction (in the orientation of FIG. 8) to provide active alignment with the optical axis of dispersion means 2, 4.

The grating 2 and the lens 4 act together as an optical wavelength filter between the pair of fibres 5 and 6 and between the pair of fibres 7 and 8. The transmission characteristic between the fibres 5 and 7 (input waveguides) and between the fibres 6 and 8 (output waveguides) is as shown in the graph of FIG. 2 relating to the FIG. 1 embodiment.

The device is tunable across 150 nm, centred in the 1.5 μm low-loss fibre window. Insertion loss is 2.9 dB and the filter bandwidth (FWHM) is 0.59 nm. Using a DFB laser with this filter, selection of channels 0.75 nm apart can be achieved with −18 dB adjacent cross-talk making the device suitable for HDWDM systems.

The filter can be tuned by moving the fibre array 3 laterally in the directions of the arrows A. The transmission characteristics of both pairs of input and output fibres (5, 6 and 7, 8) will be tuned to the same wavelength band simultaneously. Alternatively, the pairs of fibres 5, 6 and 7, 8 can be mounted on different supports, one pair being movable relative to the other to effect tuning.

Figure 9:
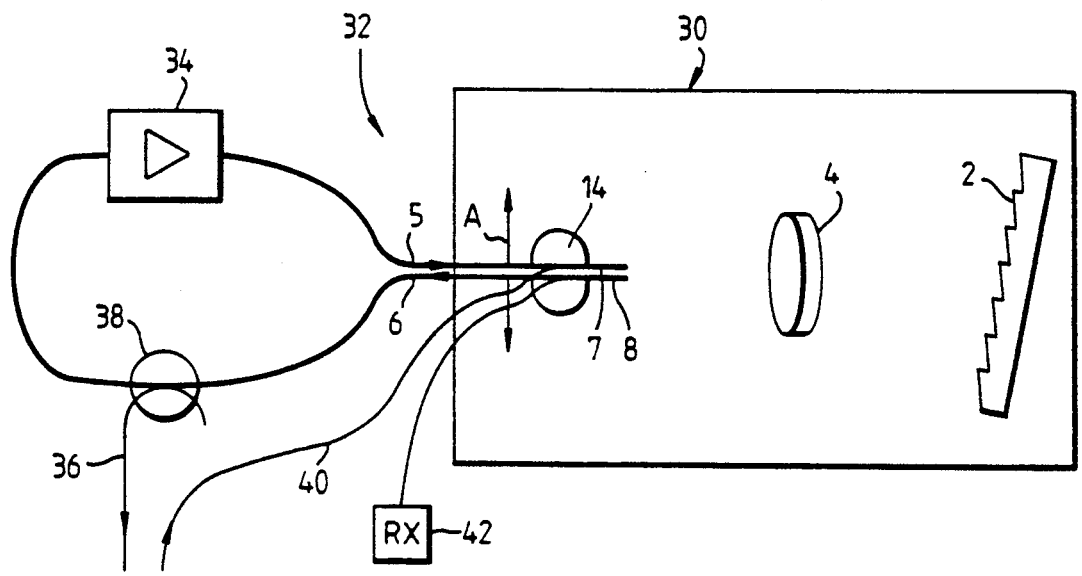
FIG. 9 is a schematic diagram of an optical transceiver using the tunable optical filter of FIG. 8.

Referring now to FIG. 9, the optical filter of FIG. 8 is shown configured to form part of a ring laser 32. The fibres 7 and 8 lie directly beneath the fibres 5 and 6, respectively.

The ring laser 32 comprises an optical amplifier 34 coupled to the fibres 5 and 6, the ring being completed by the lens 4 and the grating 2. Feedback through the optical filter (depicted by a box 30) causes lasing to occur at wavelengths selected by the optical filter 30.

Figure 10:
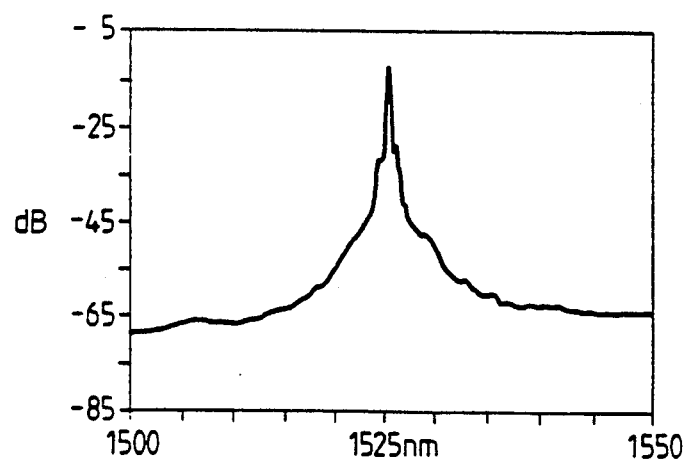
FIG. 10 is a graph of the output spectrum at 1525 nm of the ring laser of FIG. 9.

The laser output spectrum from the ring laser 32 at 1525 nm is shown in the graph of FIG. 10.

An optical output from the ring laser 32 is obtained via a fibre 36 spliced to a fused optical fibre coupler 38 spliced to the fibre 6.

The optical fibres 7 and 8 of the optical filter 30 are coupled to an input optical fibre 40 and an optical receiver 42 respectively. The optical receiver 42 is, therefore, tuned to receive the same wavelength as the ring laser 32 transmits, because of the symmetric disposition of the two pairs of fibres with respect to the lens 4 and the grating 2.

Figure 11:
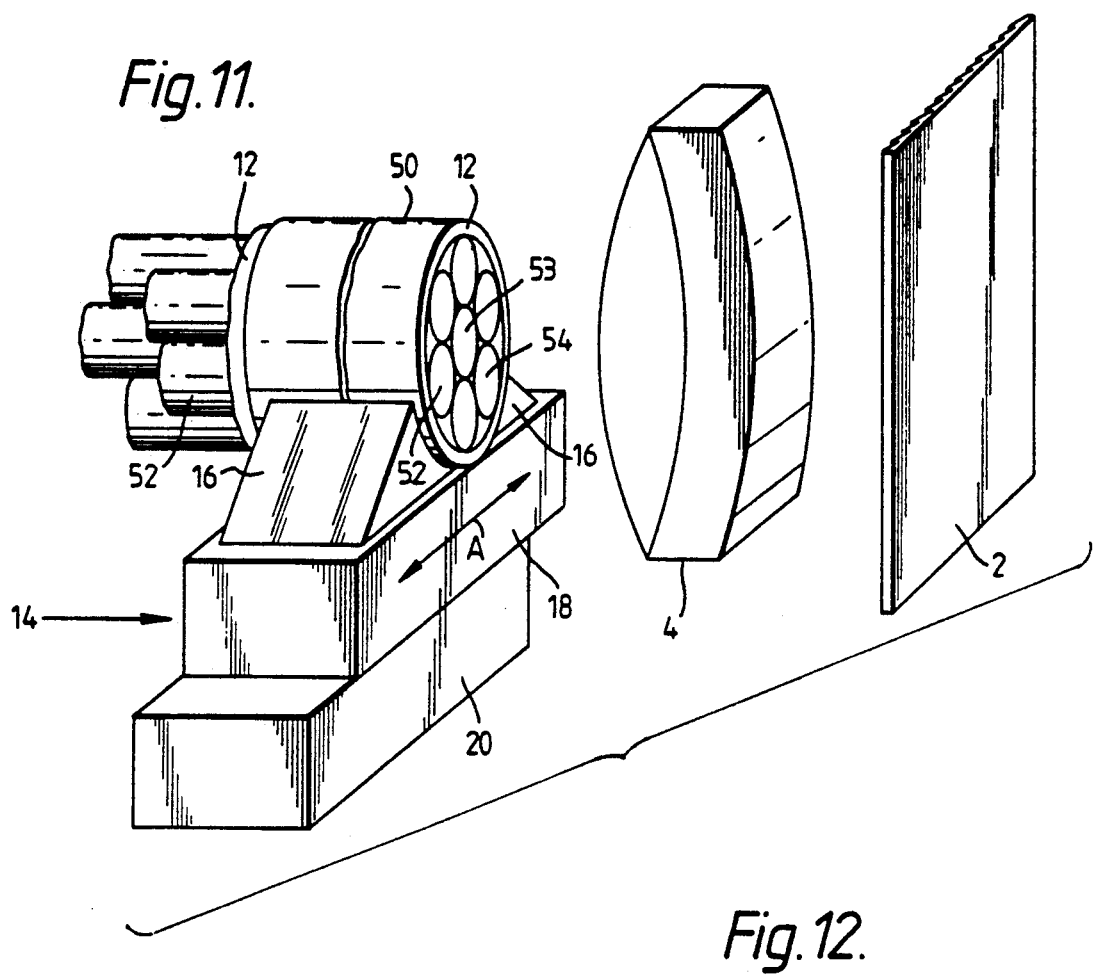
FIG. 11 is a schematic perspective view of further embodiment of an optical filter according to the present invention.

Referring now to FIG. 11, there is shown another configuration of optical filter according to the present invention suitable for duplex transmission and reception. The same component parts as those in FIG. 8 are referenced by the same numerals. In this embodiment, a larger capillary tube 50 has seven optical fibres arranged in a hexagonal array arranged such that three of them, fibres 52, 53 and 54 have centres on a line parallel to the direction A. In this case, the optical filter provides tunable filtering between the optical fibres 53 and 52 and between the fibres 53 and 54, both being tuned simultaneously.

Figure 12:
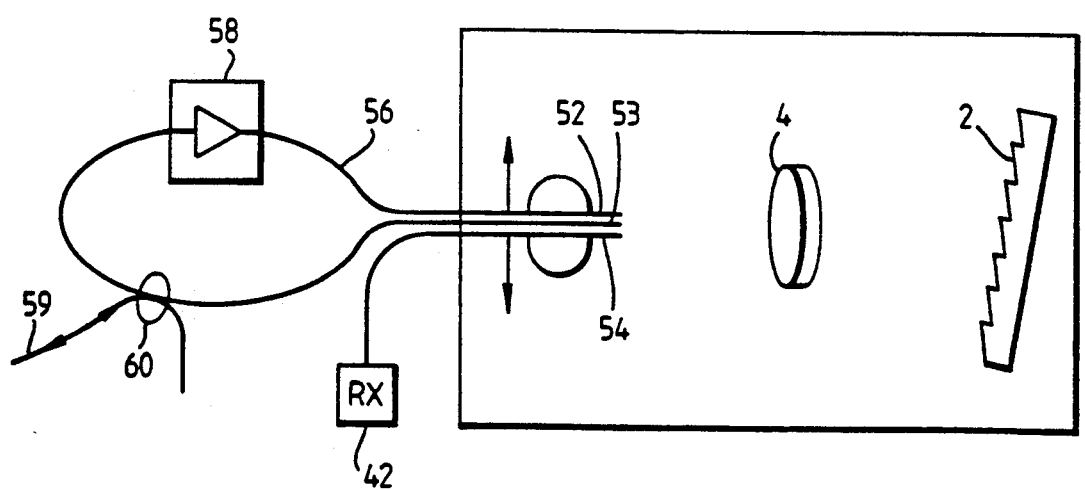
FIG. 12 is a schematic diagram of an optical transceiver using the optical filter of FIG. 11 for duplex communication.

The application of the optical filter of FIG. 11 to a duplex optical communications transceiver is shown in FIG. 12, in which a ring laser 56 comprising an optical amplifier 58 coupled to fibres 52 and 53 provides an optical output signal via an optical fibre 59 of a fused optical fibre coupler 60. In this case, however, optical signals received via the fibre 59 are coupled to the fibre 53 via the coupler 60, and the appropriate wavelength channel is filtered to the receiver 42 coupled to the optical fibre 54 of the optical filter. In this duplex case, where only three fibres 52 to 54 are used, there is a small wavelength difference between the ring laser 56 output wavelength and the filtered wavelength arriving at the receiver 42.

In the embodiment of FIG. 8, if the fibre 5 is the input fibre to the tunable filter 2, and it carries a multiplex of wavelengths, then the components of the input will form a spectrum of wavelengths in the focal plane of the lens 4. The desired wavelength will be coupled to the output fibre 6, but there is a possibility of cross-talk if another wavelength of the spectrum is coupled into the fibre 7. This could interfere with the operation of a tunable ring laser coupled between the fibres 7 and 8.

Figure 13:
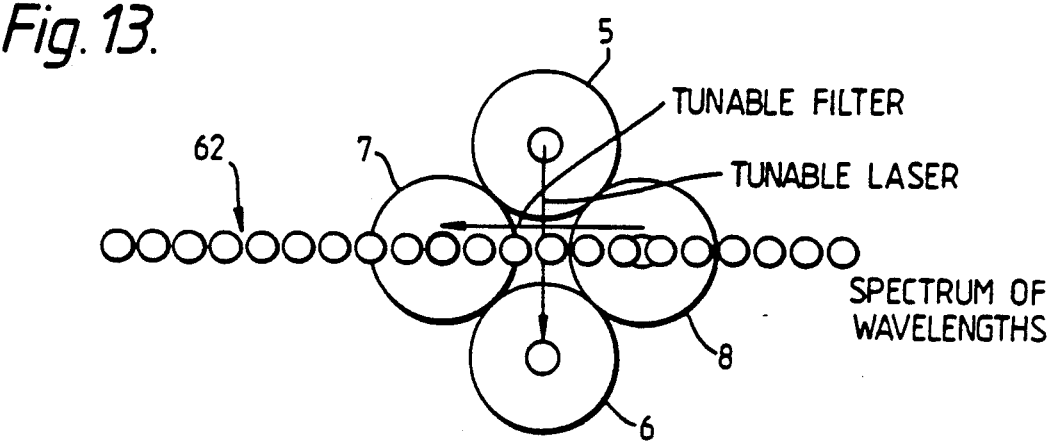
FIG. 13 is an end view of an alternative disposition of the fibres of the embodiment of FIG. 8.

A preferred arrangement of fibres to avoid this possibility is shown in FIG. 13, in which the fibres 5, 6, 7 and 8 are rotated through 45° relative to the grating 2. Now a spectrum of wavelengths 62 present in a signal launched from the fibre 7 will not couple into either of the fibres 5 and 6, but only into the fibre 8. Also, because the fibres 5 and 6, which form part of the ring laser of FIG. 9, are positioned orthogonally to the dispersion line, no unwanted reflections from signals from the fibre 5 are reflected from the grating 2 back into the fibre 5.

The embodiment of FIG. 13 allows the generation of a wavelength (via the ring laser partly formed by fibres and 7 and 8) similar to the wavelength received by the tunable filter defined by the fibres 5 and 6. However, for flexibility of wavelength switching in the local network, it may be necessary to receive and retransmit channels of different and independent wavelengths. It would still be necessary for the ring laser to be able to reference/lock the upstream (customer to exchange) wavelengths to a reference comb of wavelengths, for example a downstream ensemble. The embodiment of FIG. 14 gives this flexibility.

Figure 14:
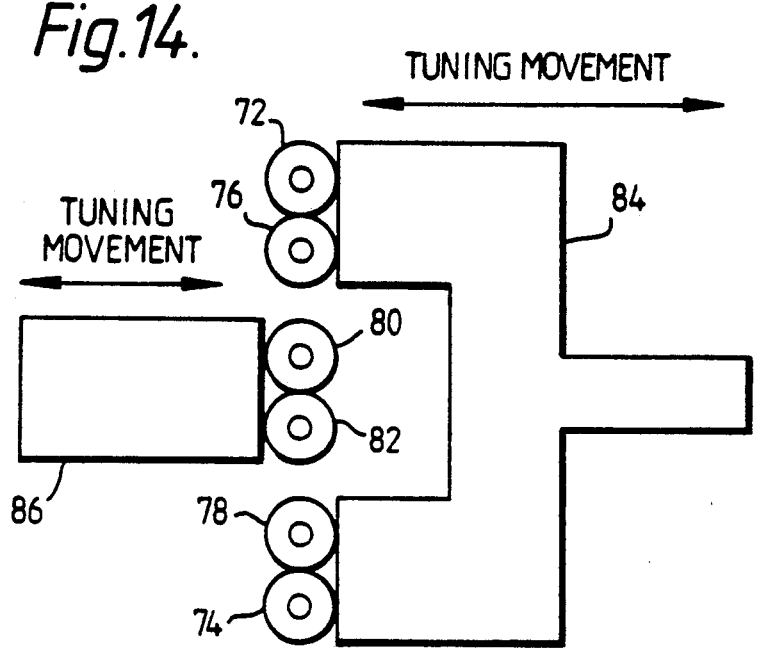
FIGS. 14, 15 and 17 is a schematic view of part of a further embodiments of the present invention each having two independently movable supports.

The FIG. 14 embodiment has three pairs of fibres 72 and 74, 76 and 78, and 80 and 82. The first two pairs of the fibres 72, 74 and 76, 78 are mounted on a movable support 84, the other pair of fibres 80 and 82 being mounted on a second, independently movable support 86. The optical dispersion means is not shown.

The fibre pairs 72, 74 and 80, 82 may form respective tunable optical demultiplexers, and the fibre pair 76, 78 may form part of a ring laser.

The filter formed by the fibres on the support 84 perform the same tuning function as the four fibre embodiment of FIG. 13, whilst the independent movement of the fibres 80 and 82 allows simultaneous tuning to a different wavelength.

Figure 15:
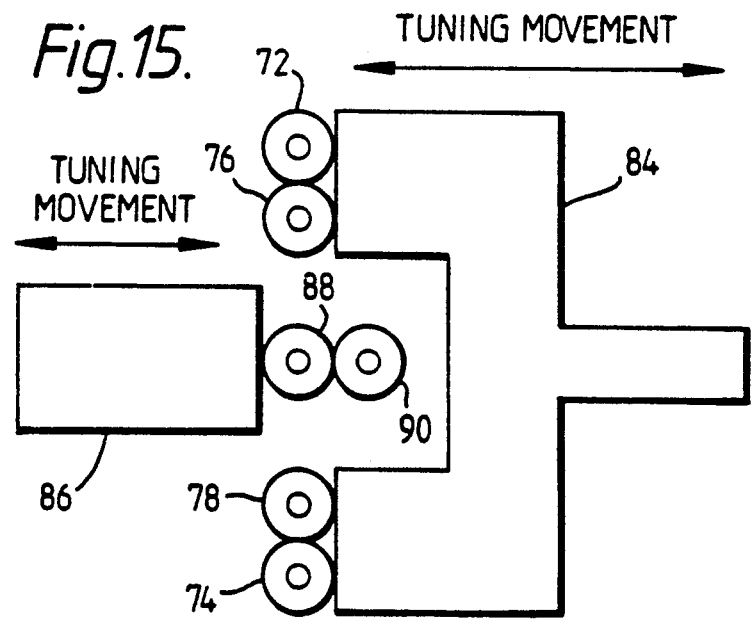

An alternative, functionally equivalent design is shown in FIG. 15, in which the fibres 80 and 82 of FIG. 14 have been replaced by fibres 88 and 90. The advantage with this design is a possible overall reduction in size of the device. On the other hand, the design of FIG. 14 may allow a cheaper construction by use of a basic building block, namely a support with a pair of fibres which are translated orthogonally to the plane defined by them, e.g. the support 26 and the fibres 80 and 82.

Figure 16:
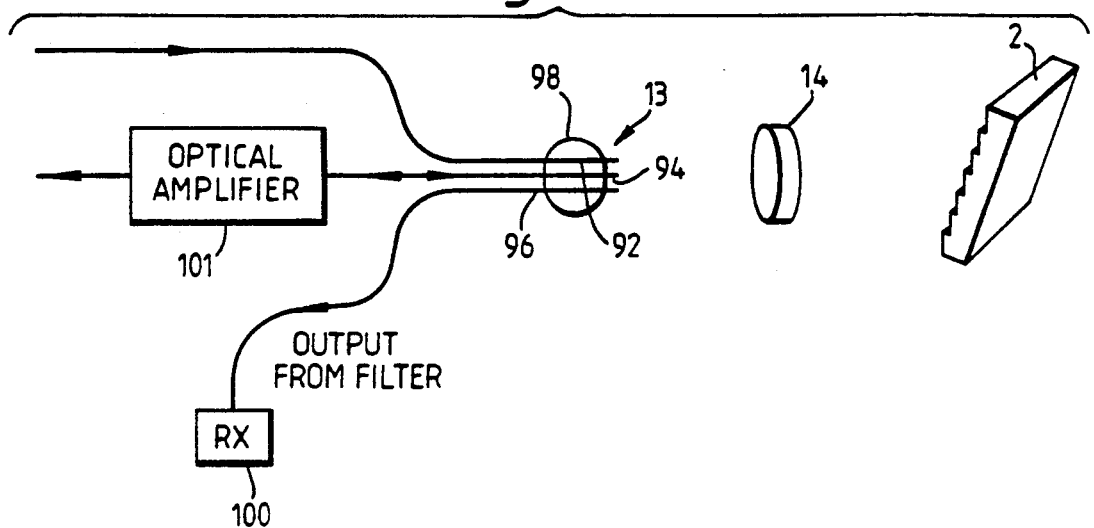
FIG. 16 is a schematic diagram of a tunable filter having three waveguides one of which forms part of an external cavity laser.

FIG. 16 shows a variation of the optical filter of FIG. 9 in which a linear array constituted by three fibres 92, 94 and 96 is mounted on a common support 98 movable orthogonally along direction 13 with respect to the plane defined by the fibres 92, 94 and 96. An optical multiplex launched from the fibre 92 into the optical dispersion means (comprising the lens 4 and the grating 2) is imaged to the end of the fibre 96 to demultiplex a single wavelength to a receiver 100.

The remaining fibre 94 is coupled to an external cavity laser 101. All three fibres move together, so that, due to the symmetry of the device, the wavelength generated by the external cavity laser 101 (specified by the position of the fibre 94) is identical to the wavelength received by the tunable filter. This device design removes the need for an optical fibre coupler (required to extract light from the ring laser), and hence reduces the loss in the laser cavity. It may also be possible to modulate this type of laser at higher speeds than the ring laser, depending on the cavity length.

Figure 17:
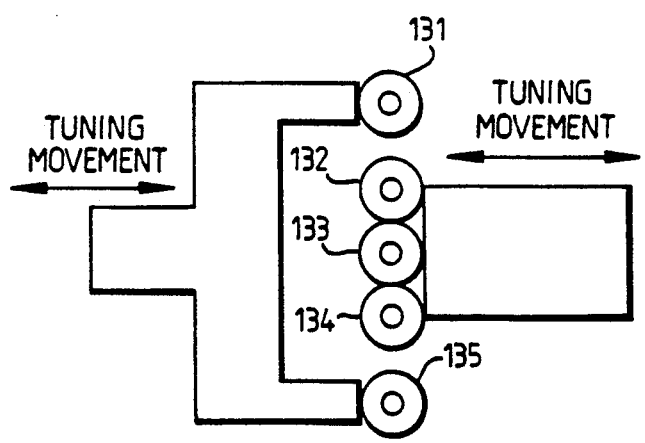

An equivalent to the 6-fibre device described above with reference to FIG. 14 (allowing independent selection of two wavelengths, one having an associated generated laser wavelength), is shown in FIG. 17 (dispersion means not shown). Here, fibres 131 and 135 form a tunable filter having independent tuning movement from fibres 132, 133 and 134 which form a tunable filter/laser as in FIG. 16. The fibres 132 and 134 act as a tunable filter, whilst the fibre 133 images to itself and forms part of a tunable external cavity laser allowing a wavelength to be generated which is identical to that received by the filter formed by the fibres 132 and 134. The same arguments which apply to the 6-fibre case also apply to this 5-fibre design.

The present invention can be generalised to more pairs of fibres, each performing the task of a tunable filter sharing the same lens/grating optical dispersion system.

Figure 18:
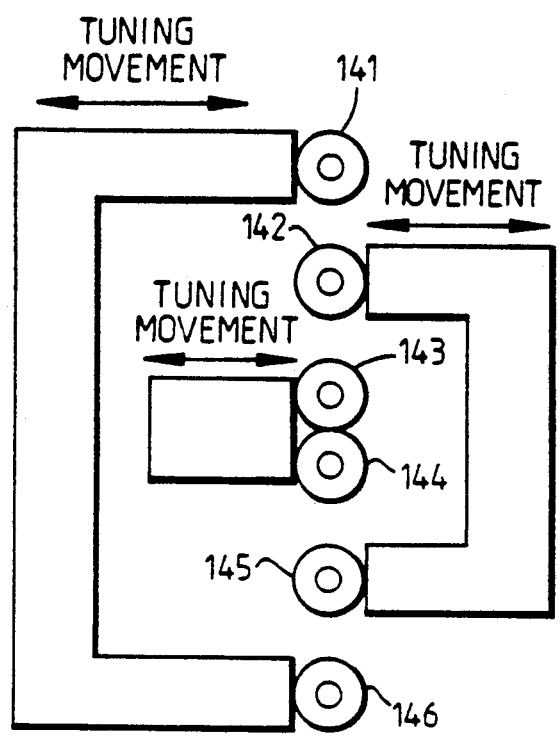
FIG. 18 is a schematic view of part of a further embodiment of the present invention having three independently movable supports.

FIG. 18 shows an optical assembly in which pairs of fibres 141 and 146, 142 and 145 and 143 and 144 image to one another and form three independent tunable filters. This could be extended to a larger number of pairs of fibres.

The tunable ring laser of FIG. 9 makes use of the same grating filter optics, and can be formed by inserting a semiconductor optical amplifier in a loop between the two fibres 5 and 6. Movement of the four-fibre array is achieved with a tracking and focusing coil (actuator) designed for use in the optical pick-up unit of a compact disc player. The position of the fibres is specified by microprocessorcontrolled, high-precision current sources, driving both the horizontal and vertical axes. The device is tunable across 150 nm, centred in the 1500 nm low-loss fibre window. Insertion loss is 2.7 dB and the filter bandwidth (FWHM) is 0.59 nm. Selection of DFB laser channels 0.75 nm apart can be achieved with −18 dB adjacent channel crosstalk, and fully out-of-band rejection is 45–50 dB.

Figure 19:
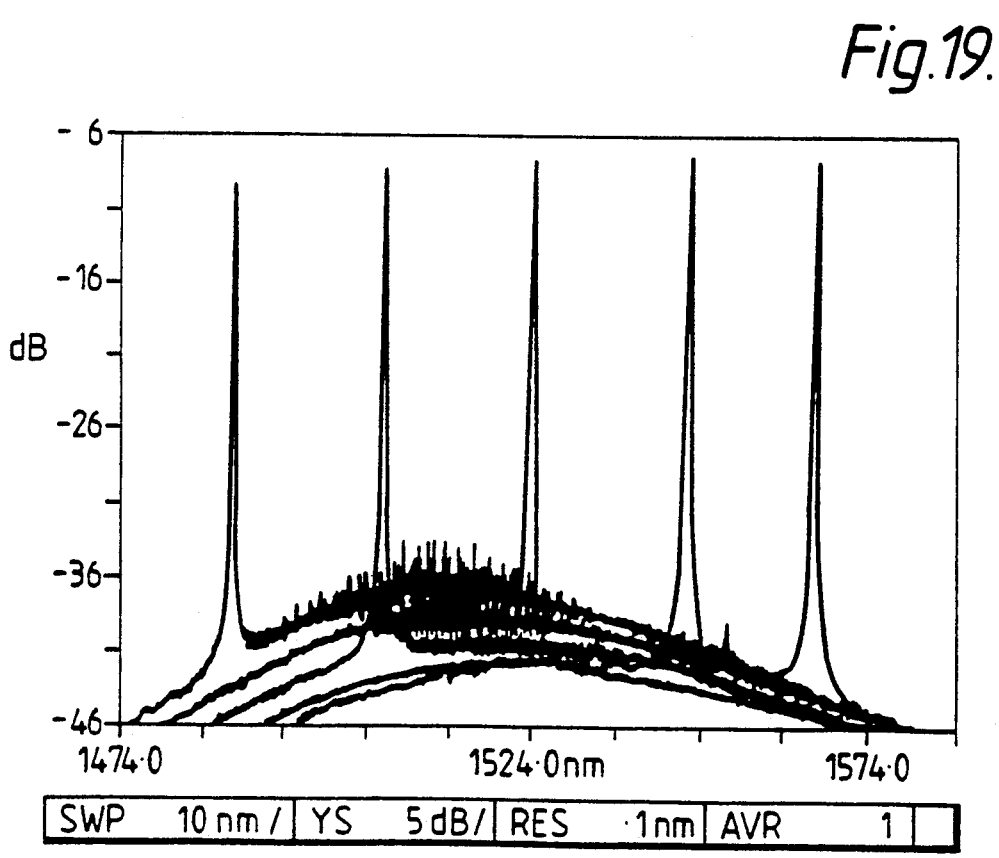
FIG. 19 is a graph of the tuning range of the ring laser of FIG. 9.

An InGaAsP buried heterostructure amplifier 101 provides approximately 10 dB fibre-fibre gain. The 3 dB coupler 38 extracts light from the ring. The ring laser 32 is tuned in conjunction with the filter by displacement of the four-fibre array. Feedback through this optical filter path causes lasing to occur selectively at any desired wavelength. The ring laser 32 is tunable over a 70 nm wavelength range, centred at 1524 nm. This limit is due to the tuning ring particular amplifier used. The full tuning range is shown in FIG. 19. The limits of the range are set by the onset of lasing in unwanted sidemodes. The peak power is −7.2 dBm, and this falls away slightly from the centre wavelength, due to the gain-spectrum of the amplifier, and to increased loss of the optical filter caused by chromatic aberrations and roll-off of grating efficiency.

The laser linewidth is dependent upon the relative position of the lasing wavelength with respect to the discrete modes of the optical amplifier, which are approximately 0.65 nm apart. The linewidth (FWHM) varies from 0.1 nm when it coincides closely with a discrete mode, to 0.3 nm when it is equidistant from two discrete modes.

The design of the device of FIG. 9 offers the ability to combine both channel selection and laser wavelength tuning simultaneously in the same physical device. The geometry of the device, where both pairs of fibres 5, 6 and 7, 8 are symmetrically placed about a common optical axis, but with one pair in the plane of dispersion and the other orthogonal to it, (as shown in FIG. 13) causes the generated laser wavelength to be systematically about 0.01 nm shorter than the wavelength of the received channel. This discrepancy is negligibly small.

Figure 22:
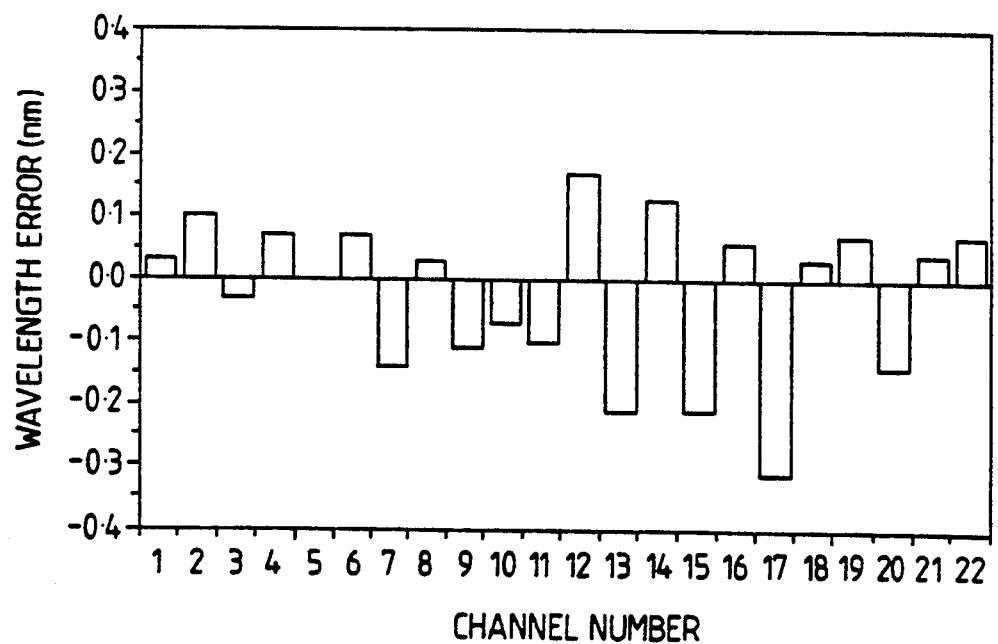
Figure 20:
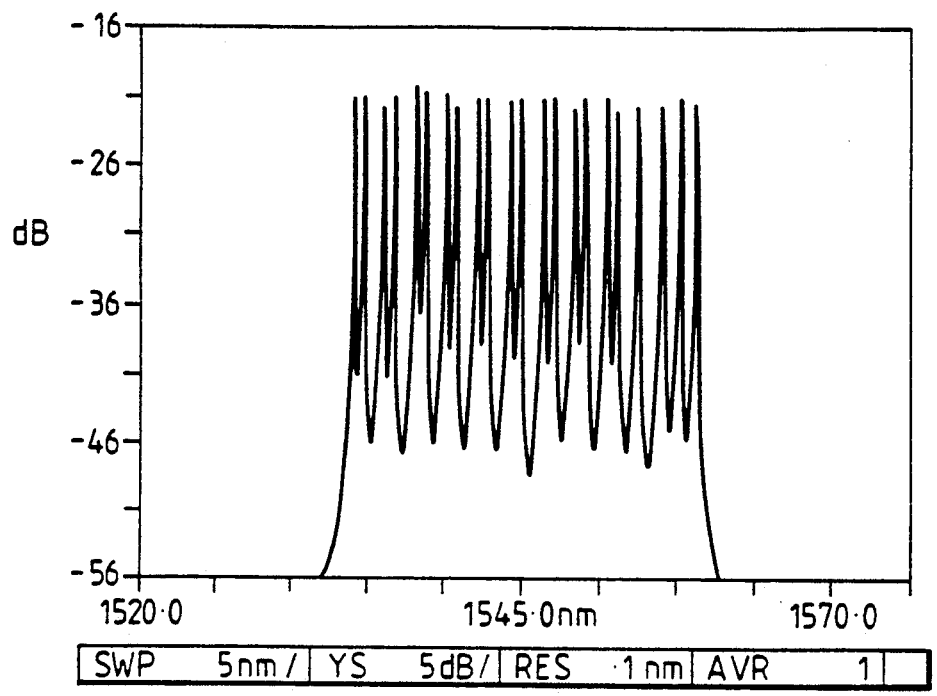
FIG. 20 is a graph of a multiplex of twenty-two DFB lasers.
Figure 21:
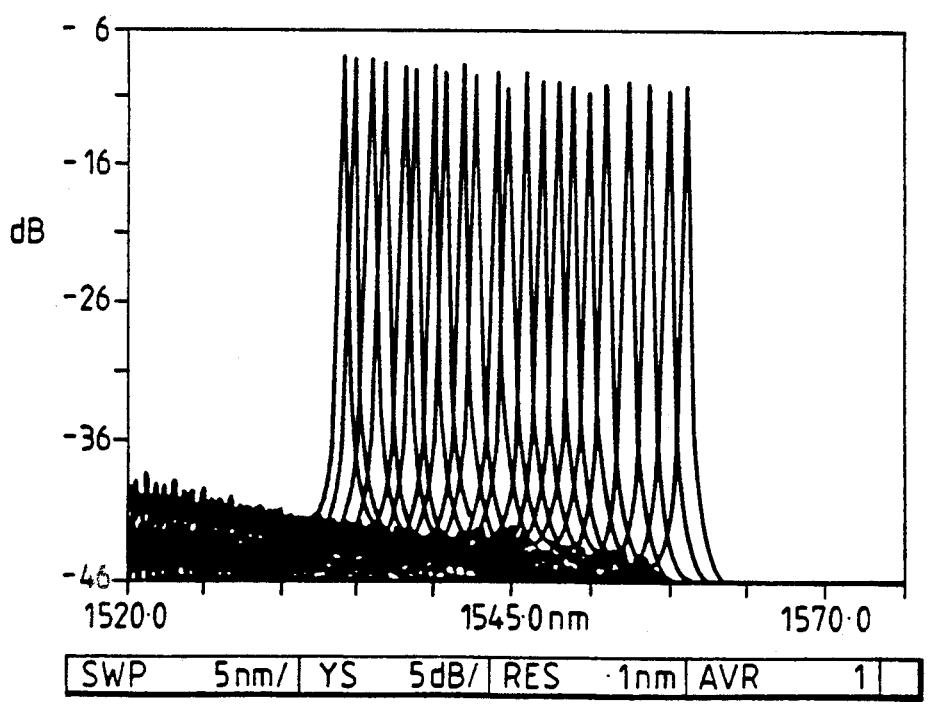
FIG. 21 is a graph of the wavelengths generated by the tunable ring laser of FIG. 9 corresponding to the multiplex of FIG. 20.

A dual-purpose, tunable filter/ring laser can be constructed to investigate how accurately the generated laser wavelength matches the filtered input wavelength. 22 DFB laser wavelength channels (1534–1556.2 nm) are multiplexed together over an experimental passive optical network, which split the power from all lasers to 28 terminals. The resulting multiplex (see FIG. 20) is used as a downstream reference comb, and input to the tunable optical filter on one of these customer terminals. The filter is tuned to each wavelength channel in turn, and the output of the tuneable ring laser is observed on a spectrum analyser. FIG. 21 shows all the generated lasing wavelengths superimposed on the same plot, allowing a visual comparison to be made with the input multiplex of FIG. 20. The discrepancies between the generated wavelengths and the reference wavelengths are shown in FIG. 22. The mean wavelength error is 0.1 nm, with a standard deviation of 0.07 nm. The worst error is 0.31 nm. The errors are caused by the residual cavity modes of the semiconductor amplifier, which tend to pull the ring laser wavelength towards the nearest mode. Improved anti-reflection coating of the amplifier facets would reduce this effect.

Wavelength referencing has been demonstrated over a 22 nm range, but would of course be possible over the entire 70 nm tuning range of the ring laser.

A wavelength-referencing scheme has been demonstrated for use at customer terminals in a wavelength multiplexed passive optical network employing an optical filter according to the present invention. The scheme accurately locks the wavelength transmitted upstream by a customer laser to a chosen wavelength channel, within a downstream reference comb of wavelengths. Accurate wavelength referencing will allow high-density wavelength multiplexing of customer lasers, and, by dynamically allocating common wavelength channels between transmitting and receiving customers, will enable wavelength-switched connections to be made between customers on different passive optical networks.

We claim:

1. An optical filter comprising:
   an optical dispersion means,
   first and second optical waveguides mounted on a common support such that a multiplexed beam of optical wavelength channels launched from said first optical waveguide into the optical dispersion means is receivable by said second optical waveguide after dispersion by the optical dispersion means, and
   means for moving the support relative to the dispersion means in a direction causing said second optical waveguide to sweep through a dispersed wavelength spectrum of the multiplexed beam of optical wavelength channels, thereby allowing any desired one of such wavelength channels to be coupled into said second waveguide.

2. An optical filter as in claim 1, further comprising a third optical waveguide also mounted on the common support.

3. An optical filter as in claim 2, in which the third optical waveguide is located at a position which receives an optical signal launched from one of the first and second optical waveguides after dispersion by the optical dispersion means.

4. An optical filter as in claim 2, in which the third optical waveguide is located at a position which receives an optical signal launched from itself after dispersion by the optical dispersion means.

5. An optical filter as in claim 1, in which the support is movable in the plane of the first and second optical waveguides.

6. An optical filter as in claim 1, in which the support is movable orthogonally to the plane of the first and second optical waveguides.

7. An optical filter as in claim 2, further comprising a fourth optical waveguide also mounted on the common support at a position which causes optical signals launched from one of the third and fourth optical waveguides to be received by the other of said third and fourth optical waveguides after dispersion by the optical dispersion means.

8. An optical filter as in claim 1, in which the means for moving the support includes a solenoid actuator.

9. An optical filter as in claim 1, in which each of the optical waveguides is single mode optical fibre.

10. An optical filter as in claim 9, in which the optical fibres are located within a capillary tube.

11. An optical filter as in claim 1, in combination with at least one further filter comprising:
    third and fourth optical waveguides mounted on a second support such that a second multiplexed beam of optical wavelength channels launched from said third optical waveguide into said optical dispersion means is receivable by said fourth optical waveguide after dispersion by the optical dispersion means,
    means for moving said second support relative to the dispersion means in a direction causing said fourth optical waveguide to sweep through a dispersed wavelength spectrum of the second multiplexed beam of optical wavelength channels, and each said support being independently movable relative to the optical dispersion means.

12. A filter as in claim 1 in combination with a transceiver, in which the first and second optical waveguides form part of a ring laser.

13. A combination as in claim 12, in which the ring laser is an optical fibre laser.

14. A fiber as claimed in claim 4 in combination with a transceiver wherein, the third optical waveguide is coupled to an external cavity laser.

15. A filter as in claim 3 in combination with a transceiver, in which the first and second optical waveguides form part of a ring laser, and an optical coupler is coupled to one of the first and second optical waveguides, whereby an optical signal can be coupled to the ring laser and launched into the dispersion means so as to be received by the third optical waveguide after dispersion by the optical dispersion means.

16. A tunable multiple wavelength division optical filter assembly comprising:

a wavelength dispersion medium; and a plurality of optical fibre pairs having entrance and exit apertures directed toward said wavelength dispersion medium;

each said pair of fibres being mounted for movement with respect to the wavelength dispersion medium and independently of the movement of at least one other pair of fibres whereby a combined tunable filter and laser connected to at least one such pair may operate on different wavelength channels.

* * * * *